United States Patent [19]

Chen

[11] Patent Number: 4,795,568
[45] Date of Patent: Jan. 3, 1989

[54] OXIDATIVE EVAPORATION PROCESS AND APPARATUS

[76] Inventor: Philip T. Chen, 28 Fairview Ave., Montvale, N.J. 07645

[21] Appl. No.: 57,491

[22] Filed: Jun. 3, 1987

[51] Int. Cl.$^4$ ............................................. B01D 12/00
[52] U.S. Cl. ..................................... 210/761; 210/274; 210/180; 210/195.1; 210/202; 210/206; 210/207; 210/209
[58] Field of Search ............... 210/758, 220, 761, 762, 210/763, 805, 806, 808, 175, 180, 194, 195.1, 198.1, 200, 201, 202, 205, 206, 207, 209, 215, 274

[56] References Cited

U.S. PATENT DOCUMENTS 4,350,599  9/1982  Chowdhury ................... 210/761
4,525,283  6/1985  Horak et al. .................. 210/762

Primary Examiner—Frank Sever
Attorney, Agent, or Firm—Darcy, Donovan & Coleman

[57] ABSTRACT

An oxidative evaporation process for treating waste water or other aqueous solutions containing organics or reduced forms of inorganics is described. The process relies upon excessive amounts of pressurized oxygen gas to both oxidize the solution and to increase the solution's evaporation rate. The oxidized liquid effluent from a reactor undergoes a series of flashing steps until a saturated solution is produced which readily crystallizes upon cooling.

18 Claims, 1 Drawing Sheet

OXIDATIVE EVAPORATION PROCESS AND APPARATUS

BACKGROUND OF THE INVENTION

The invention relates to a process and apparatus specially applied to perform water evaporation and liquid phase oxidation reactions with forced circulating media. The operation can be conducted at elevated temperature and pressure conditions. Oxygen gas, a primary oxidant, as well as the medium for forced circulation, is supplied in excess amounts and is kept circulating under pressurized condition through the reaction systems.

The oxidation reactions generate heat, which is utilized to evaporate water in the reactor. By forcing the flow of oxygen gas through the reactor, the unreacted oxygen gas sweeps the vapor out of the reactor and causes a high rate of evaporation in the limited space and volume of the reactor.

The system thus performs both oxidation of reactive substances and evaporation of water in a controlled manner. The products of the system include steam and the oxidized salts in the forms of carbonate or other salt derivatives which are recovered in solid forms.

The system serves well as a new method of treating aqueous waste solutions containing organic and/or inorganic constituents. The organic and inorganic compounds are oxidized to form carbonate or sulfate and recovered as solids, and water in the feed is reclaimed as low pressure steam.

DESCRIPTION OF RELATED ART

The conventional process for evaporation refers to the single or multi-effect evaporation system. The operation of the conventional evaporation system is conducted under vacuum and low temperature. The conventional system provides no conditions for oxidative reactions to take place. Consequently, the heat required to evaporate water is solely dependent on outside sources. It is also understood that the removal of water vapor from the evaporator in the conventional system relies on vacuum pumping operations performed by means of mechanical or hydraulic devices. In contrast to those features, the process of this invention provides a positive means to perform oxidation reactions and the water vapor produced in the evaporation process is carried out of the reactor by a forced circulating gas medium.

Another conventional process for treating waste water streams to be referenced is known as the Wet-Air-Oxidation process. It is my understanding that in this conventional process liquid and gas are maintained in a mixed phase throughout the reactor, and that the process suppresses water evaporation in order to maintain this mixed phase. The conventional process also uses air instead of oxygen gas. Further, there is no gaseous stream discharged from the reactor in the conventional process; the end product of the process is a liquid rather than separate streams of solids and steam. These fundamental differences of the new process over the conventional process results in higher efficiency in oxygen usage and greater reduction in the liquid volume of the waste stream.

SUMMARY OF THE INVENTION

The process of this invention treats aqueous solutions containing organic compounds and/or reduced forms of inorganic compounds. The solution is heated and introduced into a reactor through which oxygen gas is circulated. The oxygen gas, which is pressurized, oxidizes reactive substances in the solution and carries evaporated water out of the reactor. Effluent from the reactor, having a higher salt concentration than the feed stream of aqueous solution, is converted into a stream of crystallized salts.

DESCRIPTION OF THE PREFERRED EMBODIMENT

Figure 1:
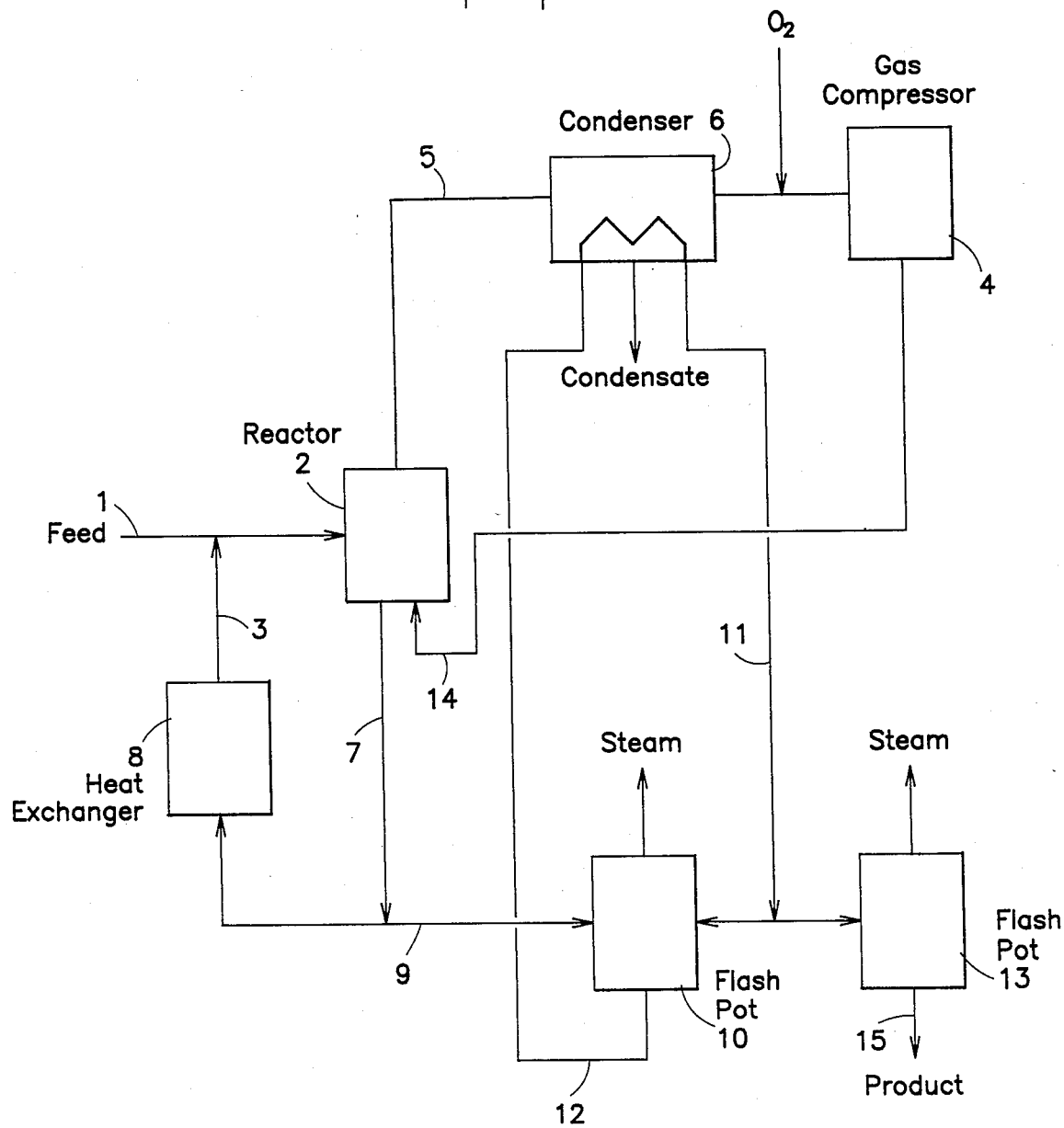
FIG. 1 is a schematic diagram of the preferred embodiment of the process and apparatus of this invention.

The feed stream 1, an alkaline solution or being adjusted to be alkaline and containing organic and/or inorganic salts, is introduced to the Reactor 2 by mixing with the heated reactor bottoms side stream 3 to gain temperature to the level required by the process reactions. Independently, a rate controlled oxygen gas 14 is introduced at the bottom of the reactor. In the reactor, liquid and gas are maintained as separate phases, and thus the reactor may be referred to as a two-phase reactor.

The Reactor 2 is pressurized with the oxygen gas at a pressure sufficiently higher than the vapor pressure of water at the reacting temperature so as to maintain the reactor liquid saturated with dissolved oxygen.

In the Reactor 2, organic compounds are converted into carbon dioxide ($CO_2$) and water ($H_2O$). $CO_2$ is in turn absorbed in alkaline solution to form carbonate salts and remain in the liquid phase. The inorganic salts, such as sulfide or bisulfides, are converted to sulfate which is also waterborne and remains in the solution.

The oxygen gas is kept circulated with the aid of the Gas Compressor 4. The circulating gas 14 will sweep out the water vapor from the Reactor 2 in an amount proportional to the rate of gas circulation. The rate of water evaporated in the reactor will thus be regulated by the rate of circulating gas.

The overhead stream 5, containing mainly water vapor and the excess oxygen gas, will be led to the Overhead Condensor 6 where water vapor is condensed. The condensate contains no salts and is readily disposable by conventional routes or can be recycled to the Reactor 2. The excess oxygen gas is recovered for reuse.

In the gas circulation loop, the make-up oxygen gas is supplied at the suction side of the compressor 4. The amount of oxygen make-up is automatically regulated by maintaining the suction pressure of the compressor constant.

The bottoms stream 7 is mainly a solution of oxidized inorganic salts, such as carbonates or sulfates. Their concentrations depend on the organic and inorganic content in the feed, and on the rate of oxygen gas circulated which controls the extent of water being evaporated. The bottoms stream is pumped to the Side Stream Heat Exchanger 8.

The Side Stream Heat Exchanger 8 is the sole source of heat supply for the entire system. Heat in the form of steam or electricity is transferred to the side stream of the reactor bottoms. The heated side stream is brought to mix with the feed stream 1 so that the influent to the Reactor 2 can be preheated. Heating the feed stream by mixing with the side stream of the reactor bottoms prevents fouling caused by polymerization or coagulation of organic compounds in the feed under high temperatures.

A net amount of the reactor bottoms 9 is withdrawn from the recycling side stream. The salt concentration in the reactor bottoms is further concentrated in a seres of flashing steps, by which water is recovered as low pressure steam and the dissolved salts are recovered as crystallized forms of salts.

Two Flash Pots 10, 13 in series are employed to achieve the recovery of salts and steam as follows. The first Flash Pot 10 provides a capacity for flashing the reactor bottoms stream and a recycled stream 11. The recycled stream 11 is the flashed liquid 12 pumped for reheating at the Overhead Condenser 6. The reheated stream 11 is then recycled to the first Flash Pot 10 until the salt concentration reaches a level tht the final flash at the second Flash Pot 13 will result in forming a saturated solution 15.

The latent heat of the reactor overhead vapor is thus utilized for reheating the flashed liquid from the first Flash Pot. The amount of heat required for reheating the flashed liquid, as indicated by the temperature of the recycled stream, is regulated by the rate of oxygen gas in circulation. The oxygen circulation rates in turn regulate the evaporation of water in the reactor. The water vapor generated in the reactor should provide a sufficient amount of heat for reheating the flashed liquid.

The steam generated from the flash pots is a low pressure steam, which is a usable energy source. The underflow from the second Flash Pot is a salt saturated solution, which forms crystals upon cooling after being discharged from the system.

When an inert gas, such as nitrogen, is used in lieu of oxygen, the process system can be utilized as a double effect evaporator. Water in the feed is evaporated in the reactor (the first evaporator) and the vapor is recovered as condensate at the Overhead Condenser. In the Overhead Condenser, the latent heat of the vapor is recovered to heat the first flash bottoms. A further evaporation of water takes place in the second Flash Pot (the second effect evaporator).

While the preferred embodiments of the invention have been shown, changes, additions and substitutions of equivalent steps and compounds can be made without departing from the spirit and scope of the invention.

What is claimed is:

1. A liquid waste treatment process, which comprises:
   a. heating the liquid waste;
   b. circulating a pressurized inert gas through the liquid waste to increase the rate of evaporation;
   c. applying the latent heat of the vapor produced thereby to further heat and evaporate the liquid waste to provide a substantially dry solid salt from the liquid waste.

2. A process for treating a feed stream of an aqueous solution containing organic compounds and/or reduced forms of inorganic compounds to produce crystallized, oxidized salts, which comprises:
   providing substantially dry solid salts by
   (1) heating the feed stream;
   (2) passing excessive amounts of pressurized oxygen gas through the heated feed stream to oxidize at least some of the compounds and to remove at least some of the water, as vapor, from the solution;
   (3) further removing water from the oxidized solution to form a salt saturated solution; and
   (4) cooling the salt saturated solution to produce crystallized oxidized salts.

3. A process as recited in claim 2, wherein the oxygen gas is passed through the heated solution within a reactor in which the liquid and gas phases are maintained separately.

4. A process as recited in claim 3, further comprising:
   removing some excess oxygen gas from the reactor; and
   recirculating back into the reator at least some of the excess oxygen gas that leaves the reactor.

5. A process as recited in claim 4, further comprising:
   removing at least most of the water vapor from the oxygen gas stream that leaves the reactor prior to reintroducing the oxygen gas stream into the reactor.

6. A process as recited in claim 4, wherein all of the excess oxygen gas that leaves the reactor is recirculated back into the reactor.

7. A process as recited in claim 2, wherein the heating step comprises:
   separating the oxidized solution into a side stream and a bottoms stream;
   heating the side stream;
   introducing the heated side stream into the feed stream.

8. A process as recited in claim 2, wherein step (3) comprises:
   flashing at least some of the oxidized solution to remove water vapor therefrom.

9. A process as recited in claim 2, further comprising:
   removing excess oxygen gas and the water vapor from the reactor together in a single gas stream; and
   removing oxidized solution from the reactor in a separate liquid stream.

10. A process as recited in claim 9, wherein step (3) comprises:
    flashing at least part of the oxidized liquid stream;
    transferring heat from the gas stream to the flashed liquid stream to cool the gas stream and condense out at least most of the water vapor therein; and
    re-flashing the flashed and heated liquid stream.

11. Apparatus for treating an aqueous solution, comprising:
    a reactor having a liquid inlet, liquid outlet, gas inlet, and gas outlet;
    means for introducing the aqueous solution into the reactor through the liquid inlet and for removing the aqueous solution from the reactor through the liquid outlet;
    means for introducing oxygen gas into the reactor through the gas inlet and for removing oxygen gas from the reactor through the gas outlet;
    means for recirculating part of the oxygen gas removed from the reactor through the gas outlet back into the reactor through the gas inlet;
    means for recirculating part of the aqueous solution removed from the reactor through the liquid outlet back into the reactor through the liquid inlet;
    means for heating the aqueous solution present in the reactor sufficiently such that the oxygen gas at least partly oxidizes compounds within the reactor and at least some of the water within the reactor is vaporized, and means for providing a substantially dry solid salt.

12. The apparatus of claim 11, wherein the vaporized water within the reactor is forced out of the reactor through the gas outlet by the circulating oxygen gas, and further comprising:

means for removing most of the water vapor from the oxygen gas before the oxygen gas is recirculated back into the reactor.

13. The apparatus of claim 11, further comprising:
means for evaporating and removing further water from the aqueous solution removed from the reactor; and
means for cooling the aqueous solution to form crystallized salts.

14. In a process of oxidizing liquid waste containing some organic constituents wherein the waste is heated and then placed into a chamber, and an oxygen containing gas is introduced into the chamber and oxidizes at least part of the waste, and the oxidized waste is removed from the chamber, the improvement comprising:
introducing the oxygen containing gas into the chamber in amounts substantially greater than necessary to oxidize the liquid waste in the chamber, so as to force water vapor out of the chamber and regulate the amount of evaporation that takes place within the chamber; and
flashing and then cooling the oxidized liquid waste to produce substantially dry solid waste.

15. A process as recited in claim 14, further comprising:
collecting low pressure steam produced in the flashing process.

16. A process as recited in claim 14, further comprising:
prior to cooling, heating the oxidized and flashed liquid waste; and
re-flashing the heated, oxidized, flashed liquid waste.

17. A process as recited in claim 14, wherein the waste is preheated by heating part of the oxidized waste stream removed from the chamber and introducing the heated stream into the waste before the waste is placed in the chamber.

18. A process as recited in claim 14, further comprising removing most of the water from the waste.

* * * * *